Oct. 20, 1931.  C. G. STRANDLUND  1,828,301
WHEELED CULTIVATOR
Filed April 17, 1925   6 Sheets-Sheet 4

Patented Oct. 20, 1931

1,828,301

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

WHEELED CULTIVATOR

Application filed April 17, 1925. Serial No. 23,810.

My invention relates to wheeled cultivator, particularly to that type embodying features of adjustment of the wheels and the devices for stirring the soil, and the object of my invention is improvement in the control of the wheels and such devices whereby operation of the cultivator is facilitated and its efficiency materially increased.

Referring to the drawings in which similar numerals indicate identical parts.

Figure 1:
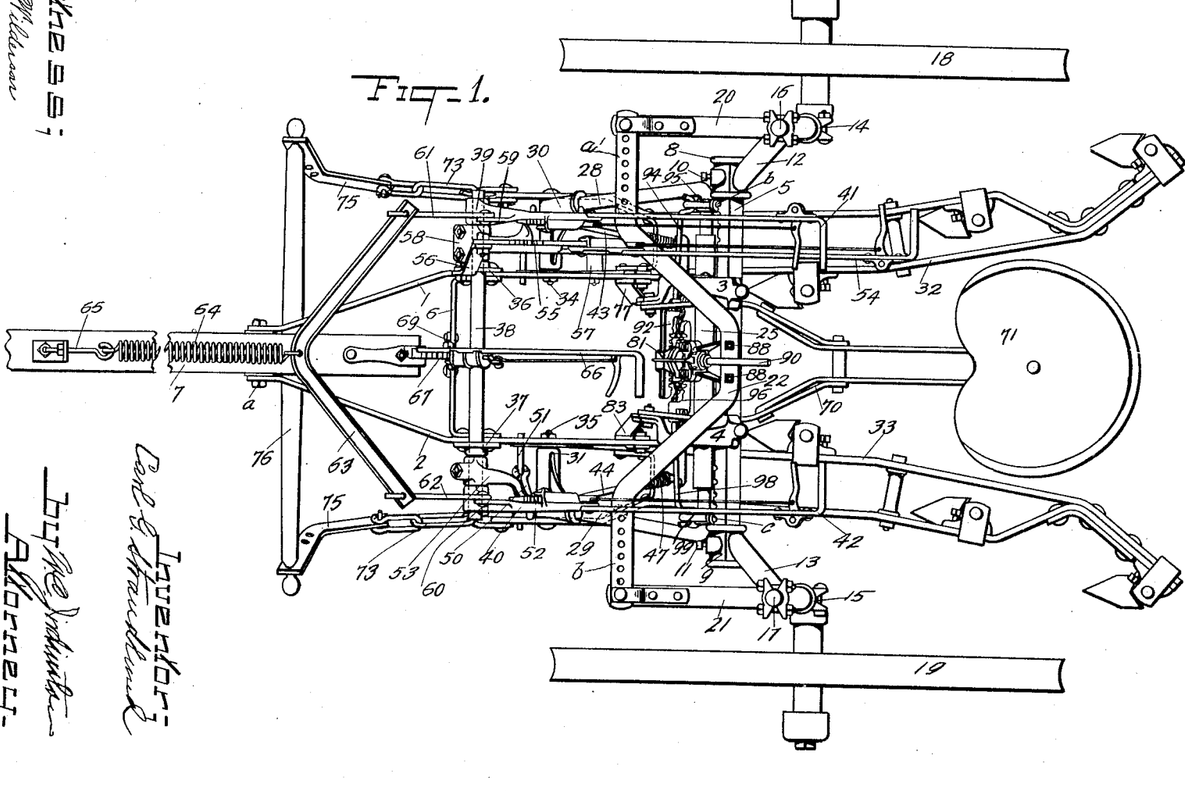
Figure 1 is a plan view of a wheeled cultivator embodying my improvements.
Figure 2:
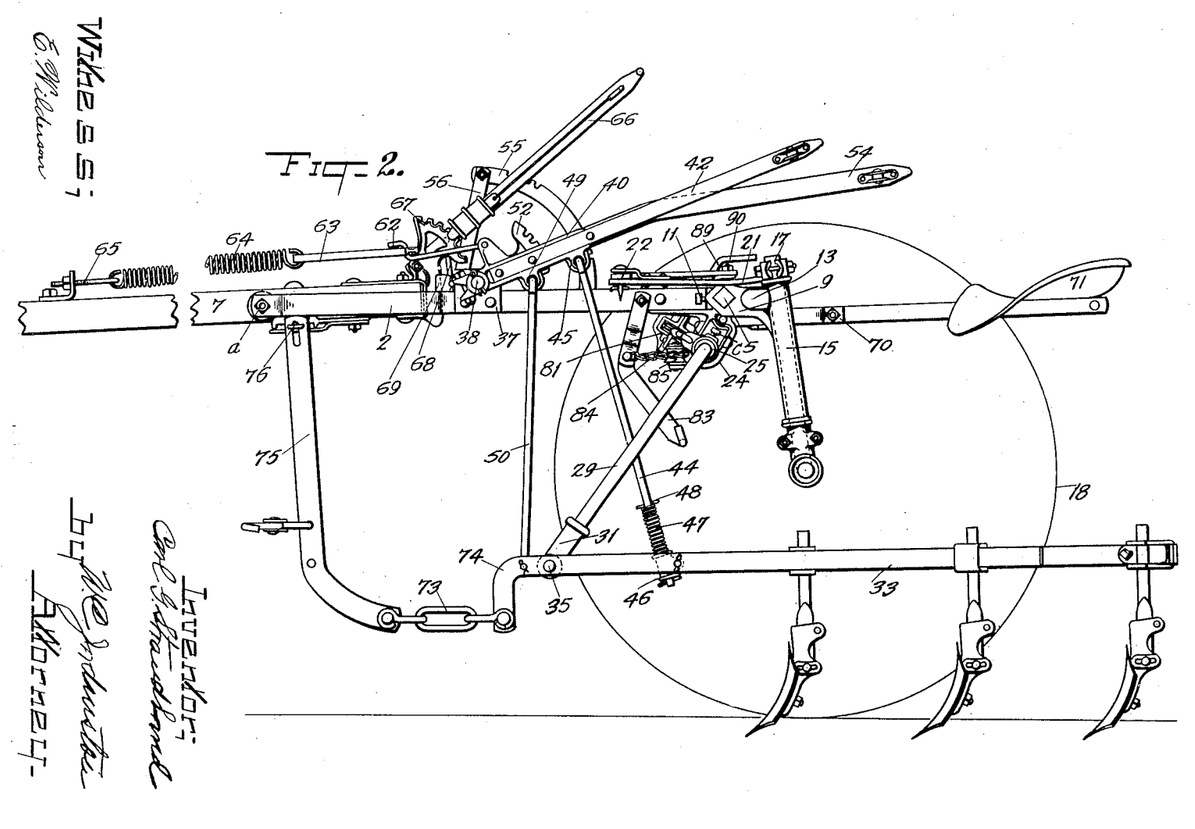
Figure 2 is a side elevation of Figure 1, with the near wheel removed and the cultivator ready for operation with the shovels in the ground.
Figure 3:
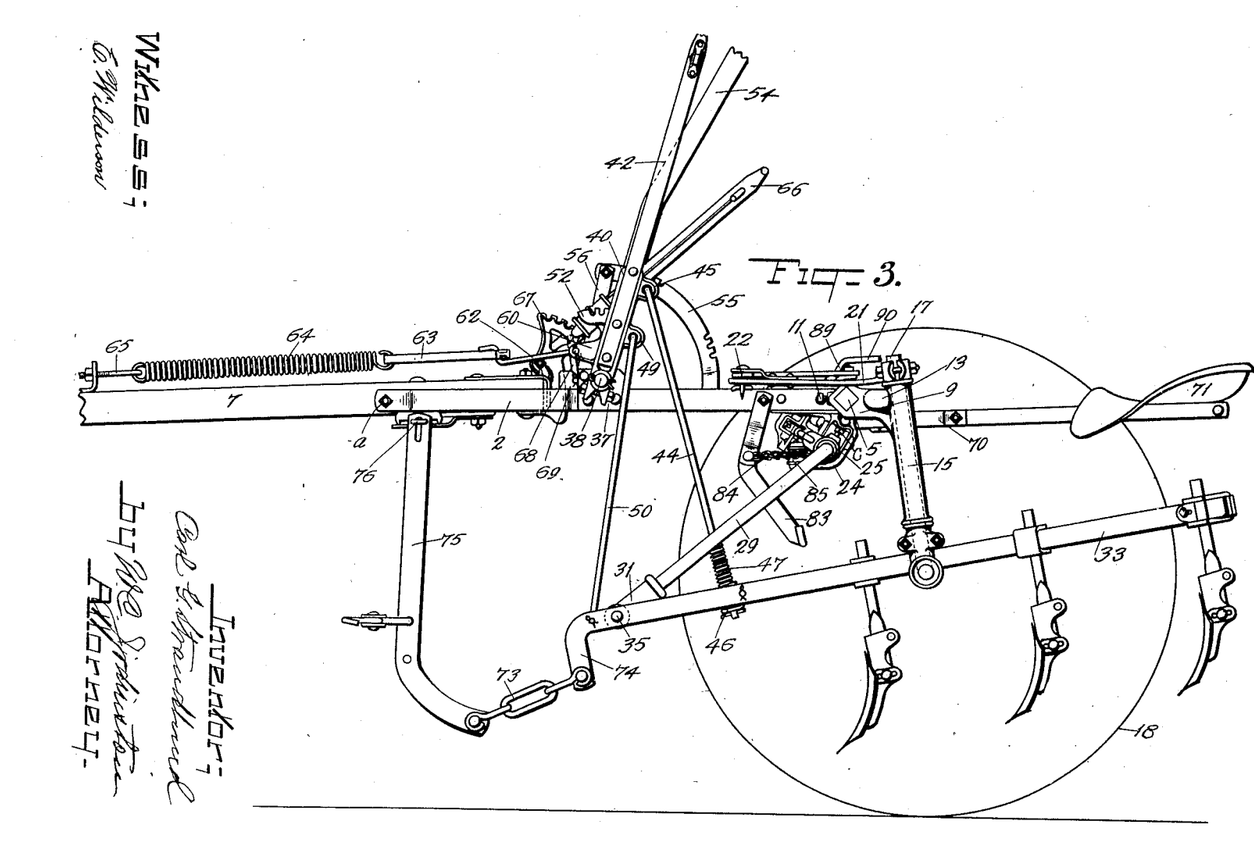
Figure 3 is a view similar to Figure 2, but with the gangs of cultivating devices raised and the connected parts in position accordingly.
Figure 4:
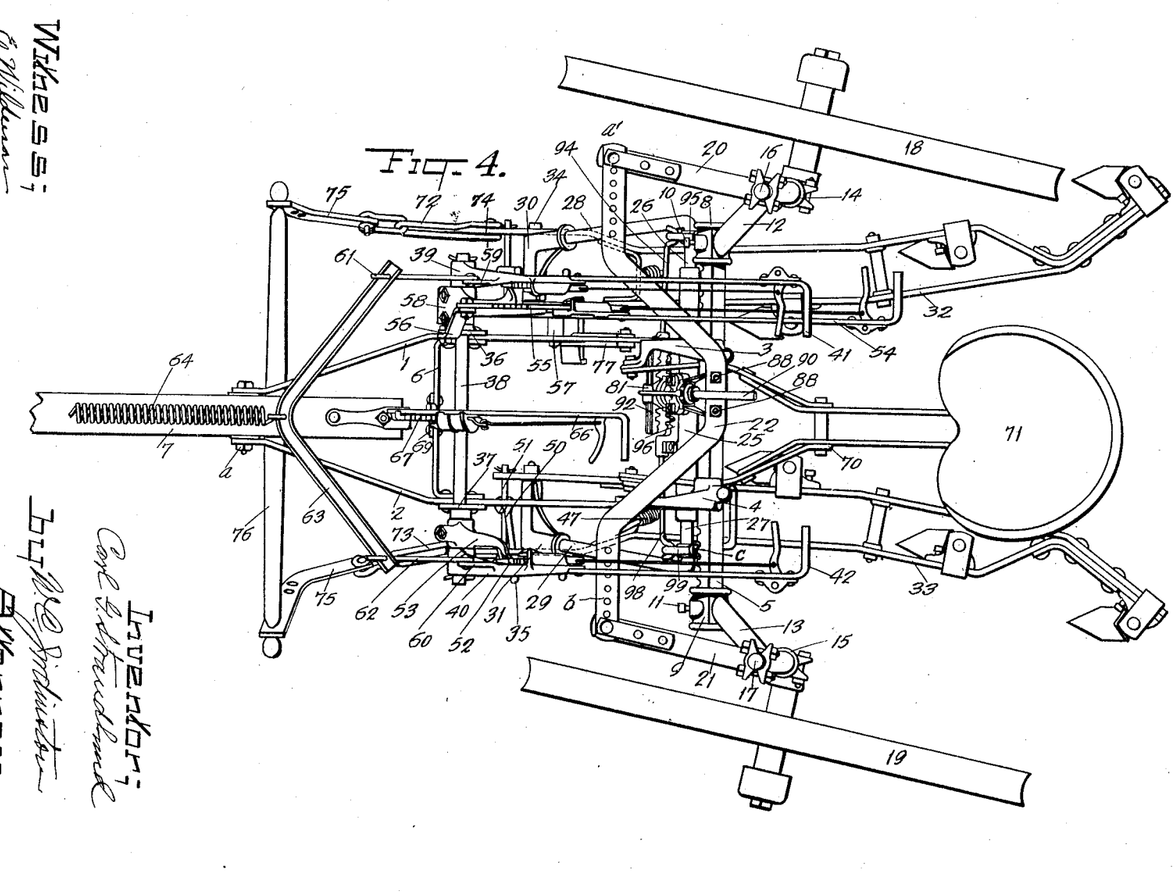
Figure 4 is a view similar to Figure 1, but with the wheels steering at an angle to the line of draft.
Figure 5:
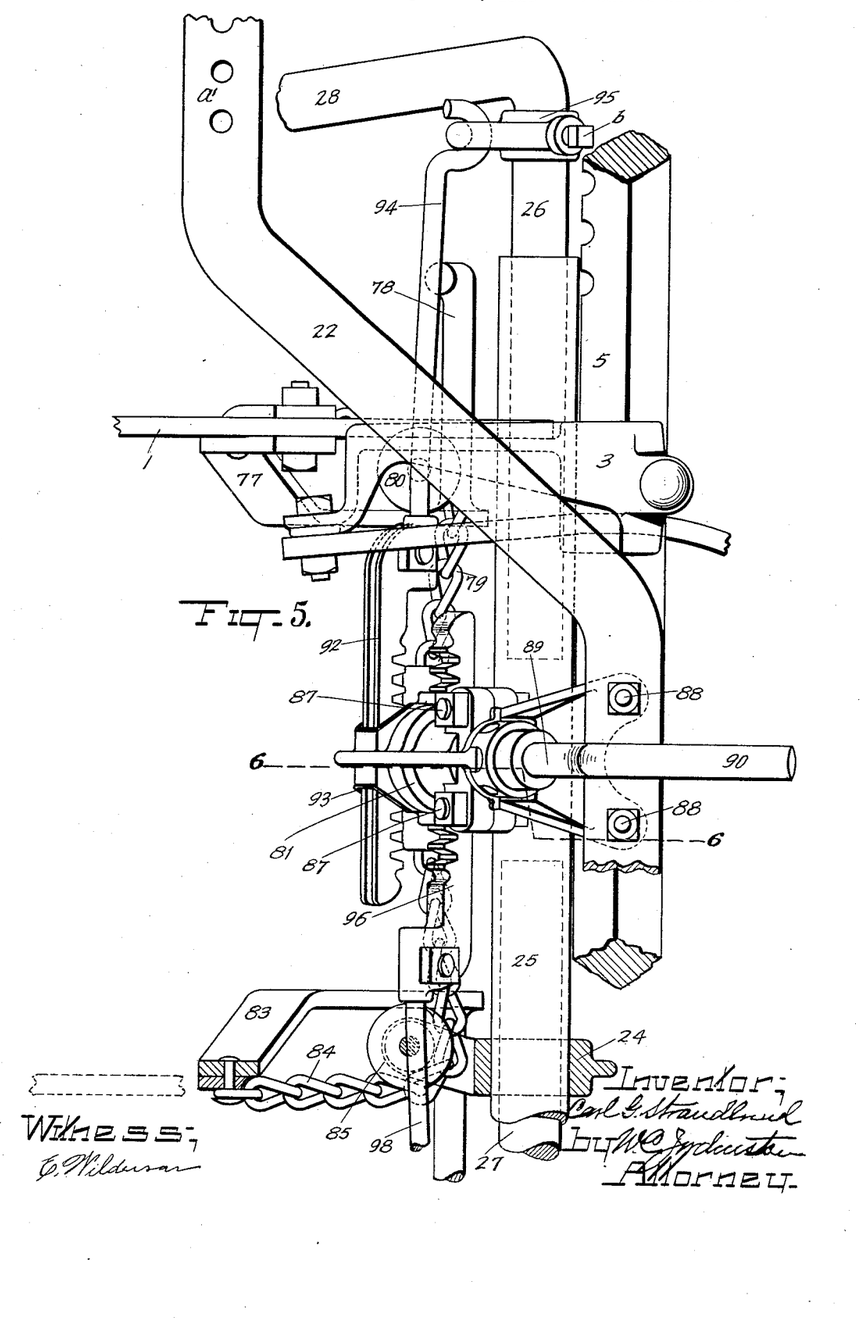
Figure 5 is an enlarged detail view of part of the mechanism for lateral adjustment of the gangs of cultivating devices.
Figure 6:
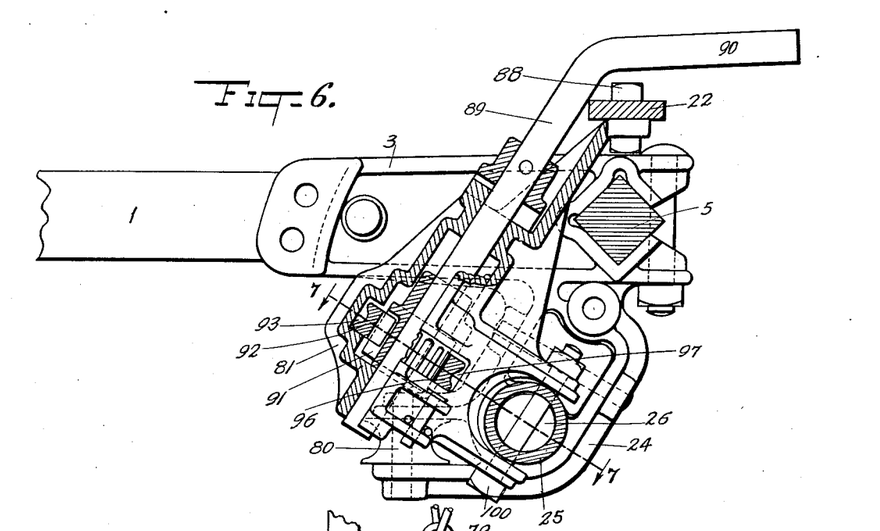
Figure 6 is a detail in part section on the line 6—6 of Figure 5.
Figure 7:
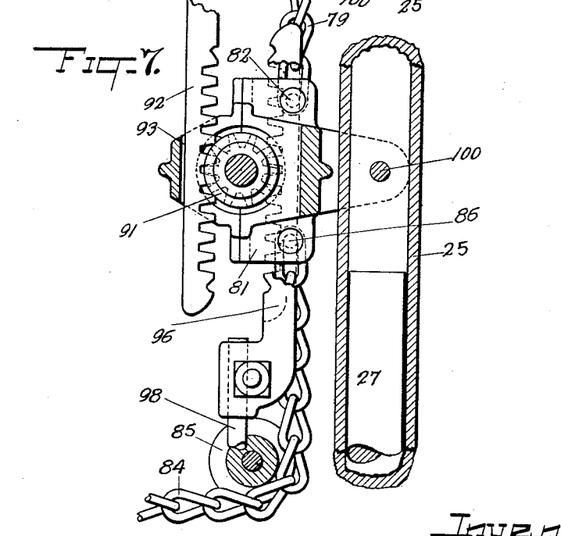
Figure 7 is a detail section on the line 7—7 of Figure 6.

Frame bars 1 and 2 are secured respectively to brackets 3 and 4, mounted on a transverse bar 5, and extend forwardly in parallelism to a brace 6 to which they are bolted. From the brace 6 the bars 1 and 2 converge and between their forward ends is pivotally secured, by a horizontal bolt a, a draft pole or tongue 7. The bar 5 is rectangular in cross-section and on the ends thereof are sleeves 8 and 9 secured in place by set screws 10 and 11. Projecting rearwardly and outwardly from the sleeves 8 and 9, and preferably integral therewith, are arms 12 and 13 having vertical sleeves 14 and 15 in which are rotatably journaled spindles 16 and 17 of crank axles provided with horizontal portions on which are journaled wheels 18 and 19. At the bend of the spindles 16 and 17 split elbows are rigidly secured and upon which the sleeves 14 and 15 rest. Rigidly mounted on the upper ends of the spindles 16 and 17 are forwardly projecting and preferably parallel arms 20 and 21 connected by an equalizer bar 22 by which the wheels are angled simultaneously as hereinafter described.

I provide a supporting arch including a tubular bar 25 slidably secured in suitable openings in downwardly projecting parts 24, of the brackets 3 and 4 respectively, and slidably and turnably mounted therein are the horizontal portions 26 and 27 of the side bars 28 and 29 of the arch, which have their lower ends secured in castings 30 and 31, the latter pivotally attached to gang beams 32 and 33 by horizontal transverse bolts 34 and 35. The gang beams are of a well known type and carry earth-stirring devices of the desired shape.

Rotatably mounted in bearings 36 and 37 on the frame bars 1 and 2 is a shaft 38, and on the ends thereof are loosely mounted castings 39 and 40 to which are riveted manually operable levers 41 and 42. A rod 44 is connected to an eye 45, on the casting 40 and extends downwardly through a sleeve 46, pivotally mounted in a well known manner on the gang beam 33, and secured by a pin or cotter beneath the sleeve; a coiled spring 47 on the rod 44, between the sleeve 46 and a pin 48 on the rod 44, is provided to exert a resilient pressure on the gang 33 when the latter is in operation. An eye 49 on the casting 40 between the eye 45 and the shaft 38, has hooked therein a rod 50 which extends downwardly to hooked engagement with a bar 51 on the forward end of the gang 33. The lever 42 is provided with the usual type of latch to engage with a notched segment 52 preferably integral with an arm 53 mounted rigidly on the shaft 38 and movable therewith.

The lever 41 is connected to the gang beam 32 in a manner similar to the connection of the lever 42 with the gang beam 33 and a detailed description thereof is believed to be unnecessary. By the operation of the parts just described, it is apparent that either of the gangs can be raised or lowered independently of the other, by operation of its respective lever. Both gangs can be raised or lowered simultaneously by operation of a master lever 54, provided with the usual latch to engage with notches of a segment 55 mounted on a standard 56 on the frame bar 1 and to a bracket 57 also on the frame bar 1. The lever 54 is secured to a casting 58 rigidly mounted on the shaft 38 and movable therewith. In the construction just described the levers are in fixed position on the frame and have no lateral movement, but as the gang beams 32 and 33 are adjustable laterally, it follows that the connections of the levers 41 and 42 to the gang beams must be such as to permit lateral movement of the gang beams, consequently as the rods have a hook attachment to their respective levers and gang beams there is sufficient flexibility for lateral swinging of the rods without interfering with their operation in raising the gangs.

To projections 59 and 60, on the castings 39 and 40, are pivotally attached links 61 and 62 which extend forwardly and are connected to a horizontally disposed V-shaped bar 63, to the apex of which is hooked a coiled spring 64 having its forward end connected to a bracket 65 mounted on the pole 7, the action of the spring tending to assist the levers 41 and 42 in raising the gangs. For vertical adjustment of a pole 7, I provide a lever 66 which is pivoted on a notched segment 67, mounted on the rear end of the pole 7, and to the lever 66 is attached a link 68, extending downwardly to connection with a casting 69 mounted on the brace 6; by operation of the lever 66 the pole can be readily swung vertically, pivoting on the bolt $a$, to the desired degree of adjustment and can be there secured by a latch on the lever 66 engaging with a notch in the segment 67.

A seat frame is secured on the brackets 3 and 4 and supports, on its rear end, a seat 71. Chain sections 72 and 73 are attached to downwardly extending parts 74 of the gang beams, and to draft bars 75 depending from a transverse bar 76, mounted on the pole 7, the draft bars being provided with suitable holes for attaching whippletrees which are not shown.

For steering the wheels, and for moving the gangs 32 and 33 toward or from each other, I provide the following mechanism: pivotally mounted on the frame bar 1 is a foot lever 77 and between its pivot and pedal 78 is attached a chain 79 leading rearwardly about a pulley 80, journaled on the bracket 24, and connected to a casting 81 by a bolt or pin 82. A similar foot lever 83 is pivotally mounted on the frame bar 2 and is connected to the casting 81 by a chain 84 which leads from the lever about a pulley 85 journaled on the bracket 4 and is secured to the casting 81 by a bolt 86. The casting 81 is split, the parts being secured together by bolts 87, and to the equalizer bar 22, preferably to the underside thereof, by bolts 88. Journaled in bearings in the casting is an upwardly and rearwardly inclined shaft 89 having a horizontal part 90. Housed in the casting 81, and secured rigidly on the crank 89, is a pinion 91. A rack bar 92 is supported in a guideway 93, in the casting 81, and meshes with the pinion 91; a link 94 is secured to the outward end of the rack bar 92 and extends to hooked connection with an eye in a collar 95 rigidly held on the horizontal portion 26 of the arch side bar 28 by a bolt $b$. A similar rack bar 96 meshes with the pinion 91 on the opposite side thereof from the rack bar 92 and is supported in a guideway 97 in the casting 81, and to the outer end thereof is secured a link 98 which has a hooked connection with a collar 99 rigidly held on the horizontal portion 27 of the arch side bar 29 by a bolt $c$. A bolt 100 secures the casting 81 to the tubular bar 25, the latter clasped in a bifurcation on the lower rear of the casting, the bolt 100 passing through the arms of the bifurcation and through the tubular bar 25 and secured by a nut.

An operator of the cultivator, from the seat 71, can very readily rotate the shaft 89 and, simultaneously, the pinion 91, resulting in moving the rack bars 92 and 96, in parallelism, toward or from each other, and as the rack bars are connected by the links 94 and 98 to the side bars 28 and 29 of the arch, to which the gangs are secured, the side bars and the gangs are moved toward or from each other according to the direction of rotation of the shaft 89, the parts 26 and 27 moving freely in the tubular bar 25, this adjustment of the gangs being accomplished irrespective of the position of the wheels relative to the line of draft. By extending the side bars 28 and 29 of the arch forwardly to connection with the gang beams, adjacent the forward ends thereof, the backward thrust of the gangs when at work is counteracted, and by my construction of the arch, and its connection with the equalizer bar, when the wheels are steered the arch and attached gangs are moved in the same direction without interfering with the adjustability of the gangs toward or from each other, the pivotal attachment of the rods 44 and 50 to the levers and the gangs permitting free lateral movement of the forward ends of the gangs with their adjustment in either direction.

Steering or angling of the wheels 18 and 19 is effected by operation of the foot levers 77 and 83 connected, as stated, to the casting 81 by chains 79 and 84 leading about the pulleys 80 and 85, so that the desired direction can be quickly attained, the wheels moving simultaneously in the same direction through the equalizer bar 22, and this steering operation is effected irrespective of the gang adjusting device, for as the casting 81 is rigidly mounted on the equalizer bar 22 and the tubular bar 25, it is evident that the gangs will be moved bodily in the direction toward which the wheels are steered. The equalizer bar 22 is a horizontally disposed yoke having its central portion above and parallel with the transverse bar 5 and diverging to transverse end portions which are attached to the arms 20 and 21 respectively. By this form of the equalizer bar, the vision of the operator is unobstructed so that he is enabled, from his seat 71, to clearly visualize the rows of plants and note their condition and the position of the cultivator gangs, relative to the rows, resulting in better control and operation of the cultivator.

As previously explained, the gangs are raised or lowered by operation of levers 41 and 42, each lever connected to its respective gangs by rods 44 and 50; the rods 44 are connected to the levers 41 and 42, intermediate the ends of the latter, and their attachment to the gangs is rearward of the connection of the side bars of the arch thereto; the rods 50 are connected to the levers 41 and 42 between the connection of the rods 44 therewith and the pivot of the levers, and are attached to the gang beams forward of the attachment of the side bars of the arch thereto, the rods 44 and 50 diverging downwardly to their attachment to the gangs, so that the gangs are raised bodily, when the levers are operated for that purpose, the rear thereof rising at a greater speed and to a greater height than the forward ends, and the extraction of the cultivating devices from the ground is accomplished in an expeditious manner, the arch resisting any tendency to a backward movement of the gangs during the operation of raising and lowering.

What I claim is—

1. In a cultivator, the combination with a frame, of supporting wheels, crank axles for the supporting wheels having vertical spindles rotatably journaled on the frame, a horizontally disposed yoke-shaped equalizer bar having its ends forwardly disposed and connected with said spindles and movable to rotate said spindles to steer the wheels, an arch slidably supported on the frame and including a central member connected to said equalizer bar and side members slidably mounted on the central member and connected with the gangs, and means operable to actuate the equalizer bar to steer the wheels and simultaneously move said arch and gangs in the same direction.

2. In a cultivator, the combination with a frame, of supporting wheels, crank axles for the supporting wheels having vertical spindles rotatably journaled in bearings on the frame, a horizontally disposed yoke-shaped equalizer bar connected with said spindles and movable to rotate said spindles to steer the wheels, an arch having a central member slidably supported on the frame and connected centrally to said equalizer bar and having side members slidably mounted on the central member and connected to said gangs, said equalizer bar having its central portion disposed rearwardly of the connection of its ends with said spindles, and means operative to move said equalizer bar to steer the wheels and simultaneously move said arch and gangs in the same direction.

3. In a cultivator, the combination with a frame including a transverse bar, of supporting wheels, crank axles for the supporting wheels having vertical spindles, bearings on said bar in which the spindles are rotatably journaled, a horizontally disposed yoke-shaped equalizer bar connected with said spindles and having its central portion rearward of the connection with said spindles, gangs of cultivating devices, an arch slidably supported in bearings on the transverse bar and including a central member connected to the equalizer bar and side members slidably mounted in the central member and extending forwardly and downwardly and connected to the gangs, and means operable to actuate the equalizer bar to steer the wheels and simultaneously move the arch and gangs in the same direction.

4. In a cultivator, the combination with a frame including a transverse bar, of supporting wheels, crank axles for the supporting wheels having vertical spindles, bearings on said bar in which the spindles are rotatably journaled, a horizontally disposed yoke-shaped equalizer bar having its ends connected with the spindles and movable to rotate said spindles to steer the wheels, the central portion of the equalizer bar being parallel with the transverse bar in the vertical plane thereof, gangs of cultivating devices, an arch including a central bar slidably supported on the frame and connected centrally to the equalizer bar, forwardly and side bars of said arch slidably mounted on the central bar and extending to connection with said gangs, and means on the frame operable to move said equalizer bar, gangs and the arch simultaneously in the same direction.

5. In a cultivator, the combination with a frame including a transverse bar, of supporting wheels and gangs of cultivating devices, crank axles for the supporting wheels having vertical spindles, sleeves mounted on said bar in which said spindles are journaled, arms rigidly secured on said spindles and extending substantially parallel with the line of draft, a yoke-shaped horizontally disposed equalizer bar pivotally attached to said arms and movable to operate said arms and rotate the spindles to steer the wheels, an arch slidably supported in bearings on the transverse bar and connected to the equalizer bar and to said gangs, and means supported on the frame operable to move said arch and gangs simultaneously.

6. In a cultivator, the combination with a frame, of supporting wheels, gangs of cultivating devices supported forwardly on the frame, an arch slidably supported on the frame including a transverse tubular bar and downwardly and forwardly extending side bars connected to said gangs, horizontal portions of the side bars slidably mounted in the tubular bar, means operative to adjust the side bars and gangs toward or from each other, and means to steer the wheels and simultaneously move the cultivating gangs in the same direction.

7. In a cultivator, the combination with a frame, of supporting wheels, gangs of cultivating devices supported forwardly on the frame, an arch slidably supported on the frame including a transverse tubular bar and downwardly and forwardly extending side bars connected to said gangs, horizontal portions of the side bars slidably mounted in the tubular bar, means operable to move said arch and gangs simultaneously transversely of the frame in either direction, means to adjust said arch side bars and gangs toward or from each other irrespective of the movement of the tubular bar, and means to steer the wheels and simultaneously move the gangs in the same direction.

8. In a cultivator, the combination with a frame, of dirigible supporting wheels, gangs of cultivating devices supported forwardly on the frame, an arch slidably mounted on the frame including a transverse tubular bar and downwardly and forwardly extending side bars connected to said gangs, horizontal portions of the side bars slidably mounted in the tubular bar, means to steer the wheels and simultaneously move said arch and gangs in the same direction, and means operable to adjust said side bars and gangs toward or from each other irrespective of the steering of the wheels and simultaneous movement therewith of the tubular bar.

9. In a cultivator, the combination with a frame including a transverse bar, of dirigible supporting wheels, gangs of cultivating devices supported forwardly on the frame, bearings on said bar, an arch including a tubular bar slidably mounted in said bearings in parallelism with the transverse bar and having downwardly and forwardly extending side bars connected to said gangs, said side bars having horizontal portions slidably supported in the tubular bar, an equalizer bar connected with said wheels and to the tubular bar, means on the frame operable to move said equalizer bar to steer the wheels and simultaneously move said arch and gangs in the same direction, and means mounted on said equalizer bar and tubular bar operable to adjust the arch side bars and connected gangs toward or from each other irrespective of the movement of the equalizer bar and the tubular bar.

10. In a cultivator, the combination with a frame, of pivoted axles and supporting wheels, cultivating gangs, laterally moving means connecting the axles and operable to steer the wheels, rack bars connected to said gangs and adjustable in parallelism in opposite directions, a support for the rack bars rigidly mounted on said connecting means, a shaft cranked at its free end journaled in the support, a pinion rigid on said shaft meshing with the rack bars and actuable by rotation of said shaft to move the rack bars and connected gangs toward or from each other, and means on the frame operable to move said connecting means laterally whereby the wheels are steered and the cultivating gangs are simultaneously moved in the same direction.

11. In a cultivator, the combination with a frame, of pivoted axles and supporting wheels, gangs of cultivating devices, laterally movable means connecting the axles and operable to steer the wheels, a supporting device secured on the connecting means, rack bars connected to said gangs and carried by said device and movable laterally in parallelism in opposite directions, a shaft journaled in said device having a crank at its free end and a pinion rigidly mounted on its opposite end meshing with the rack bars and turnable by rotating said crank to actuate said rack bars whereby the gangs are moved toward or from each other, and means on the frame connected to said device and operable to move said connecting means laterally to steer the wheels and simultaneously carry said cultivating gangs in the same direction.

12. In a cultivator, the combination with a frame, of pivoted axles and supporting wheels, gangs of cultivating devices, laterally movable means connecting the axles and operable to steer the wheels, rack bars connected to said gangs and adjustable in parallelism in opposite directions, a support for the rack bars rigidly mounted on said connecting means, a shaft journaled in said support and cranked at its free end, a pinion rigidly mounted on the opposite end of said shaft meshing with said rack bars and turnable by rotating said shaft to actuate the rack bars whereby the gangs are adjusted toward or from each other, foot levers mounted on the frame and connected with said support and operable to actuate said connecting means to steer the wheels and simultaneously move said rack bars and gangs in the same direction irrespective of the adjustment of said gangs relative to each other.

13. In a cultivator, the combination with a frame, of pivoted axles and supporting wheels, gangs of cultivating devices, an equalizer bar connecting the axles and shiftable to steer the wheels, a supporting device rigidly secured on said bar intermediate the ends thereof, rack bars slidably mounted in said support and connected with said gangs, a shaft journaled in said support and cranked at its free end, a pinion secured on the opposite end of said shaft and meshing with the rack bars and turnable by rotation of said shaft to actuate the rack bars and adjust the gangs of cultivating devices toward or from each other, foot levers mounted on the frame, chains connecting the foot levers with said support whereby the equalizer bar is shiftable laterally to steer the wheels by operation of said levers, and the support and rack bars and gangs are moved simultaneously in the same direction irrespective of the position of said gangs relative to each other.

14. In a cultivator, the combination with a frame, of pivoted axles and supporting wheels, gangs of cultivating devices pivotally supported on the frame for vertical and lateral movement, an equalizer bar connecting said axles and shiftable laterally to steer the wheels, a support rigidly mounted on said bar longitudinally central thereof, a tubular member rigidly secured on said support, supporting bars pivotally attached to said gangs and having horizontal portions slidable in the tubular bar, foot levers pivotally mounted on the frame having chain connections with said support and operable to shift the equalizer bar to steer the wheels and simultaneously move the support and cultivator gangs in the same direction, rack bars slidably mounted in said support and movable laterally in parallelism in opposite directions, links connecting the rack bars with the supporting bars, a shaft rotatably journaled in said support and cranked at its free end, and a pinion on the opposite end of said shaft meshing with the rack bars and operable by rotating said shaft to actuate the rack bars and move said supporting bars and connected gangs toward and from each other irrespective of the operation of steering the wheels.

15. In a cultivator, the combination with a frame, of pivoted axles and supporting wheels, gangs of cultivating devices pivotally supported on the frame for vertical or lateral movement, an equalizer bar, a support rigid on the equalizer bar, rack bars slidably carried on said support and connected with said gangs and adjusted in parallelism in opposite directions, a shaft journaled in said support cranked at its free end, and having a pinion on its opposite end meshing with said rack bars and rotatable by turning said shaft to actuate the rack bars and adjust the gangs toward or from each other, foot levers mounted on the frame connected with said support and operable to actuate said equalizer bar to steer the wheels and simultaneously move said rack bars and gangs in the same direction irrespective of the adjustment of said gangs relative to each other whether they are raised or lowered.

16. In a cultivator, the combination with a frame, supporting wheels therefor, and gangs of cultivating devices, of a shaft extending transversely of the frame and journaled in bearings thereon, levers mounted on the shaft, rods connected to the levers intermediate the ends thereof extending downwardly and attached to the gangs, rods connected to said levers between the attachment of the first mentioned rods thereto and the pivot of the levers, and connected to the forward ends of the gangs, said levers and rods operating to raise said gangs bodily and the rear thereof more quickly than the forward ends, and an arch slidably mounted on the frame having side bars extending downwardly and forwardly and secured to said gangs between the connections of said rods thereto.

CARL G. STRANDLUND.